(Model.)
G. APPLEGATE.
SULKY PLOW.
No. 249,869. Patented Nov. 22, 1881.
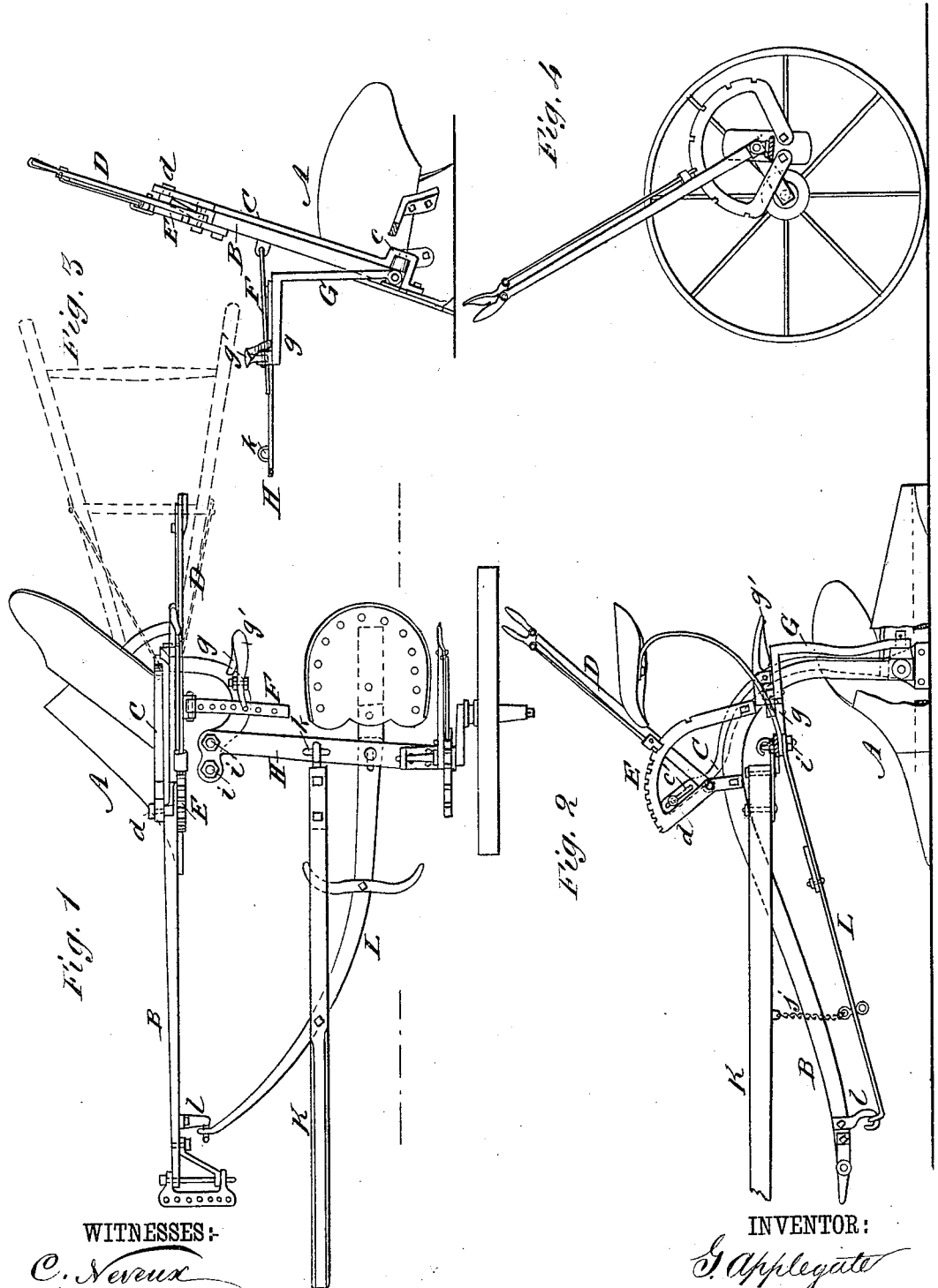
WITNESSES:
C. Neveux
C. Sedgwick
INVENTOR:
G. Applegate
BY Munn & Co
ATTORNEYS.
N. PETERS. Photo-Lithographer. Washington. D. C.

UNITED STATES PATENT OFFICE.

GEORGE APPLEGATE, OF YONCALLA, OREGON.

SULKY-PLOW.

SPECIFICATION forming part of Letters Patent No. 249,869, dated November 22, 1881.

Application filed June 1, 1881. (Model.)

*To all whom it may concern:*

Be it known that I, GEORGE APPLEGATE, of Yoncalla, in the county of Douglas and State of Oregon, have invented certain useful Improvements in Sulky-Plows, of which the following is a specification.

The object of my invention is to provide means whereby the depth and width of the furrow cut by the plow may be easily regulated and the plow controlled while in motion, and to provide a plow of light construction and draft, and one which can be easily turned at the corners, and capable of such manipulation as to adapt it for plowing in indirect lines or curves.

The invention consist, principally, in hinging the beam of the plow to the standard and in connecting the sulky to the plow by means of a suitable upright, which is also hinged to the plow.

The invention also consists in the construction and arrangement of the parts, as hereinafter fully described.

In the accompanying drawings, Figure 1 is a plan view of my invention. Fig. 2 is a section of the same, taken on the line $x$ $x$ of Fig. 1, with a portion of the landside of the plow broken away. Fig. 3 is a rear elevation of the plow, and Fig. 4 is an inside elevation of the wheel and its regulating-lever.

Similar letters of reference indicate corresponding parts.

A represents the plow-body, which may be of any approved form and construction, and B represents the hinged main beam, and C the auxiliary beam of the plow. The auxiliary beam is secured rigidly, by bolting or otherwise, to the landside or other part of the plow-body, and is preferably formed at the lower end with the double bend $c$, in which is formed the journal for one end of the pivot, upon which the lower end of the main beam is hinged, the other end of the pivot being journaled in the landside of the plow. The upper end of the auxiliary beam is formed with a slot, $c'$, through which the headed stud $d$, which is formed on the end of the short arm of the bent lever D, passes. The lever D is pivoted a short distance above the main hinged beam to the dentated crest E, which crest is securely bolted to the hinged beam. By means of the lever D and the headed stud which passes through the slot in the end of the auxiliary beam, as just described, the two beams of the plow are tied together—that is, held against lateral separation from each other—and by carrying the lever forward or backward the distance between the point of the plow and the main beam is increased or diminished, and thus the depth of the furrow made by the plow can be regulated, or the plow thrown entirely out of the ground, if desired.

To the side of the beam B is hinged the perforated plate F, which is adapted to be engaged with the perforated horizontal curved upper end, $g$, of the upright G by any suitable means, preferably by means of the downward projection on the end of the spring-actuated foot-lever $g'$, which is pivoted to the upper side of said upright, as shown in Fig. 1. The upright G is hinged at its lower end to the landside of the plow, and the upper horizontal end of it is formed with bolt-holes, and the sulky-axle H is secured to it at this point by the bolts and nuts $i$ $i$ passing through suitable holes formed in said axle, corresponding with the holes through the upright. The sulky-axle is of ordinary construction, and is provided with a seat and with the ordinary lever mechanism for raising and lowering the axle. The center of the axle H is provided with the loop $k$ for attaching the tongue K to the plow, and to the under side of the axle is bolted one end of the bar L, while the other end thereof is formed into a loop and connected with the loop or hook formed on the downward extension, $l$, attached to the forward end of the main beam near the clevis, and serves to brace or support the same while being used. The tongue is attached to the bar L by means of the short chain $j$, which should be of such length that when the plow-body is thrown out of the ground by the lever D the tongue will support the plow and carry it above the ground for convenience in traveling.

In use, the team is to be attached to the plow three abreast—two horses to the tongue and one to the main beam of the plow—and the body of the plow is then regulated to cut the required depth by the lever D, the desired width of furrow being obtained by the lateral movement of the plow, which movement is permitted by the hinged upright G when the foot-lever is disengaged from the perforated plate F. The foot-lever and the lever D and the lever for regulating the axle of the sulky are all in reach of a person sitting upon the seat of the plow, and thus the plow is always under easy and sudden control in all of its movements, both vertical and lateral; and by the lateral movement of the plow the plow may be inclined to either side, which changes the direction of the plow, adapting it to follow short curves and turn short corners without crowding or otherwise distressing the team.

In case the sulky attachment is not used the plow may have or be provided with the ordinary plow-handles, as shown in dotted lines in Fig. 1, by which the plow may be used by hand in the ordinary way.

Though I have shown the sulky attached to the landside of the plow, it is obvious that the same might be attached to the opposite side of the plow by reversing the upright G and the seat and bar L, in which case the team should be arranged two abreast.

Having thus fully described my invention, I claim as new and desire to secure by Letters Patent—

1. The plow A, formed with the auxiliary beam C, in combination with the hinged beam B, and the lever D, substantially as and for the purposes specified.

2. In a sulky-plow, the combination, with the upright G, hinged at the lower end to the landside of the plow, of the plate F, hinged to the side of the plow-beam, and the axle-plate H, secured to the upper end of said upright, as shown and described.

3. The beam C and the hinged beam B, united and operated by the lever D, in combination with the hinged upright G, plate F, and the sulky-axle H, substantially as and for the purposes specified.

4. The hinged beam B and the axle H, in combination with the tongue K, connecting-bar L, and chain or similar connecting device j, substantially as and for the purpose specified.

5. The upright G, adapted to be hinged to the plow, in combination with the axle H and the sulky, and the plate F, substantially as and for the purposes specified.

GEORGE APPLEGATE.

Witnesses:
JOHN G. LANDER,
R. A. BOOTH.